NO PRINTED SPECIFICATION AVAILABLE
9035X
F. Stedman,
Planing and Matching Machine.
Patented Aug. 17, 1835.
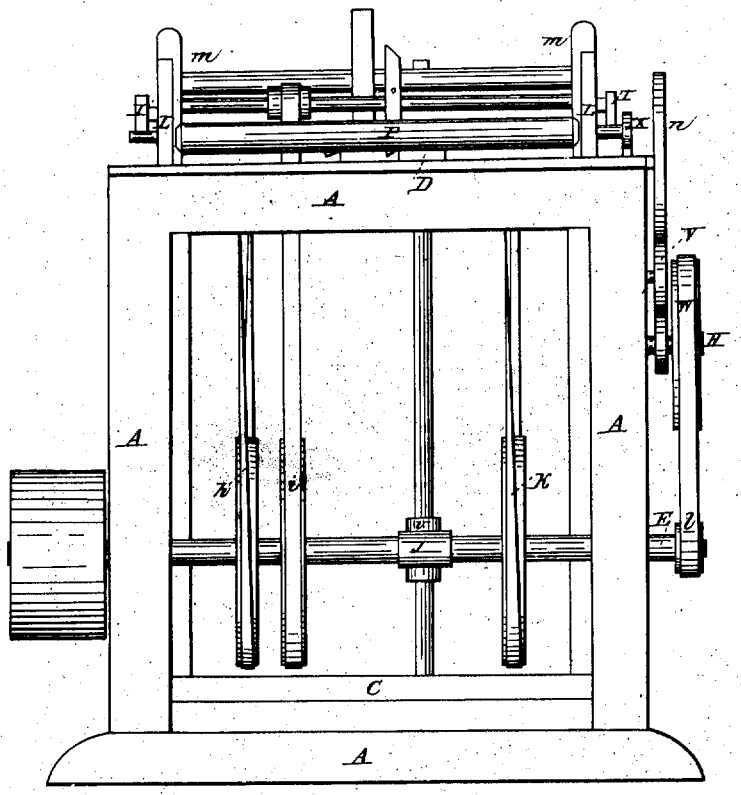

Fisher Stedman
Letters Patent

The Schedule referred to in these Letters Patent and making part of
the same containing a description in the words of the said Fisher Stedman
himself of his improvement in the method and machinery for match
ing & dressing boards and plank for floors roofs & other purposes

---

To all persons to whom these presents shall come; Be it known that I Fish
er Stedman of Aquackanack in the County of Essex and State of New Jer-
sey have invented a new and useful improvement in the method and ma-
chinery for matching and dressing boards & plank for floors roofs and other
purposes. And that the following is a full and exact description of the construc-
tion and operation of the said machine as invented by me. This machine
consists of a substantial frame 8 feet long 2 7/12 feet wide and 2 4/12 feet
high formed by connecting 4 corner posts at the top by plates and beams all
round and by connecting the posts at the bottom by two girths on each side of
the frame and by framing the lower ends of the posts into two cross pieces
which projecting 6/12 feet beyond the posts forms a side support to keep it steady
on the floor. This frame work is represented on the drawings and by the model
accompanying this specification and is marked A. And in the following
description of this machine that end having on it the driving shaft and from
which the boards when dressed are delivered will be called the front end and
the opposite the back end. And the side having on it the driving pully will
be called the pully side and the opposite the gear side. On the outside of the
front posts one foot upwards from the cross piece or foot are bolted the bearings
or caps to sustain the main shaft marked a. From the inside of each
plate 6 feet from the front end a slotted stand is projected upwards the
part forward of the slit rising perpendicularly about 6 inches the other is turn-
ed back at the top to receive the pin of the pressing lever. the bottom of the slit
serves as a bearing for the moving roller which carries forward the board
to be dressed and dovetailed and the upper part of the slit serves as a guide
to the pressing roller these stands are marked b, about 5 1/2 feet from the the front of the frame a post is secured to the girths and plates of the frame on
the inside and perpendicular to them rising 8/12 of a foot above the top of
the plate. And 14/12 feet from the posts are similar ones in all respects the up-
per end of each is connected with its fellow on the same side of the frame by
two girths one at the top and the other 8/12 of foot down leaving a space of 8/12
of a foot between them and arranged with keys to adjust them. in these girths
are the bearings of the shafts of the two dove tail cutters marked c,c. and the
shaft of the pressing roller marked d,d. and the shaft of the straighening
saw marked e,e, 6/12 feet from the front end a bridge tree rests on and
is secured to the plates to form and hold the upper bearing of the upright
cutter shaft marked B. and directly under and perpendicular to this
is a similar piece resting on and secured to the girths below to sustain
the step of the upright shaft. this piece is marked C. seven feet from the
front end are projected stands similar in all respects to those marked
b. to sustain a like roller and pressing roller near the back end of the ma-
chine to carry out the board when finished. these stands are marked f,f.
A piece of plank is then secured to the top of the end beams raising them
to a level with the upper surface of the bridge tree. On the top of the plate as
many beams as are necessary (say three) to support the frame and work
are placed extending across the frame with their upper surfaces level with
the last mentioned pieces. On the back beam and on the bridge tree is a stand
fitted to hold a roller to press the board edgeways to the guide hereafter mention-
ed. these stands are moveable to admit different sized boards and project to-
wards the front of the machine and are marked g,g. 9/12 of a foot from the gear
side and parallel with the plate, and on the upper surface of the beams and
bridge tree a guide is extended the whole length of the frame to govern the lat-
teral motion of the board and is marked D.. When all these parts and pie-
ces are thus adjusted, the main shaft marked E. is entered in its bear-
ings having on the pulley end outside the frame a fast and loose pulley
12 inches in diameter and at 2 inches from the post inside the frame a pul-
ley 15 inches in diameter marked h. to drive the circular straightening
saw and 2 inches from this pulley another pully marked i. 15 inches
in diameter to drive the upper dove tail cutter. And 2 inches from
this

9035X this pully a pully marked j 9 inches in diameter to drive the upright
cutter or traverse wheel shaft. And 3 inches from this a pully marked K.
15 inches in diameter to drive the under dove tail cutter and on the gear end
of the shaft outside of the frame is a pully 3 inches in diameter marked l,
to drive the gearing. A carrying roller extending across the frame 1 1/2 inches
in diam^ter marked m, m, is placed in each of the slitted stands so that
the board when entered upon them will just clear the bridge tree and
beams having on each near their gear ends a cog wheel of 18 teeth and on
the extreme ends a cog wheel of 60 teeth marked n, n, The upper and
lower dove tail cutter shafts are then entered in their bearings having
on them each a pulley 4 inches in diameter and in a line with their res-
pective driving pullees on the main shaft. And each a dove tail cutter with
their irons so formed as to shape the dove tail as required these cutters are
marked o, o, and are situated as to form the dove tail on each edge of the
board on opposite sides and each to cut the board half through. The friction
roller shaft is then placed in its bearings having on a friction roller 4 inch-
es in diameter bearing on the board to keep it steady to the action of the
cutters and saw. this roller is marked p. The shaft of the straightening
saw is then entered on its bearings having on it a pully 4 inches in diam
eter in a line with its driving pully on the main shaft. and also a com-
mon circular saw which cuts the board to its proper width. this saw is
marked q. The upright cutter shaft is then placed in its step and bear-
ing marked H. and has upon it a pully marked r 9 inches in diame-
ter and in a line with its pully on the main shaft marked j and on
the top a horizontal cutter wheel marked G. 13 1/2 feet in diameter and
3 inches thick having four or more cutter rests projecting from its periph-
ery 1 1/2 inches and standing diagonally (say) 45 degrees to its perpendic-
ular. in these rests is cut a female screw to hold the cutters in place.
These cutters are formed with a slit through which the said screw pass-
es and are held by its head firmly to the rests and are circular on the
edge that when they pass or traverse the board they cut like a gouge
and are marked t. An upright stand marked K. to hold a pully &
gear geer wheels is then secured to the girth & plate 4 feet from the front end
on the geer side outside of the frame. And in this piece 1 1/2 feet from the
girth a stud is fixed to hold a pully 9 inches in diameter marked u,
having on the inside and connected with it a cog wheel of 18 teeth di-
rectly over this and at such a distance as to geer properly into it is a stud
holding a geer wheel of 60 teeth marked v. and on each side of the last
mentioned wheel is an intermediate or stud wheel on studs secured
to the plates of 60 teeth marked w, and gearing also into the wheels on
the moving roller marked n, n, the pressing rollers are then placed in
the slitted stands having on their geer ends a cog wheel of 18 teeth mark-
ed x x to geer into the small wheels on the moving roller shaft and
having a score turned in the bearing outside of the stand to receive
the pressing levers. Which levers are marked I. and are secured to the
curved part of the slitted stands by a bolt on which they play freely and rest
on the scores of the pressing roller and are then projected to any suitable
length and weighted at each end as shewn by the model on the pul-
ly side or they may be continued roll to roll as shown on the geer side
of the model and weighed between the rollers, The horizontal guiding
pullies marked y, y, 4 inches in diameter are then placed in their
stands q, q, so as to bear against the edge of the board opposite to the rest
and compell it to keep [illegible] to it. When all these parts and pieces
are thus formed and adjusted pass a belt from the first pully men-
tioned on the main shaft inside of the frame and arround the pully
on the shaft of the circular saw, then a belt round the next pully men-
tioned and around the pully on the shaft of the upper dove tail cutter shaft.
Then a belt arround the next pully mentioned on main shaft and arround
the pully on the upright shaft then a belt arround the next pully on
main shaft and arround the pully on the under dove tail cutter shaft,
then pass a belt arround the pully on the geer end of the main shaft and
arround the pully marked u, having on it the geer wheel. Then a pass
a belt from the mooving power of the mill arround the fast pully on the
main shaft and all will be in motion. Then enter a board between
the front mooving and pressing rollers taking care to keep it up to the
guide guide until it is fairly entered and it will be drawn in by the motion of
the rollers untill it reaches the dove tail cutters when a dove tail will be
cut on each edge or opposite sides. the saw will cut it to a width at each
end and the cutters on the wheel G. will traverse the upper side and dress it
to a thickness and by pressing over it will leave it perfectly dressed and smooth
on the surface and it will be pressed out of the machine in form of the minia-
ture piece marked K, in the model and as soon as one board is fully en-
tered another may be put in and the machine be kept constantly at work
and all the boards will match truly and form with each other perfect
joints when laid together. The advantages of this machine consists when dress-
ing boards for roofs is that each dove tail will form a trough by which
the water will always be passed without leak to the end of the board and
for whatever purpose they may be used this mode of matching has this ad-
vantage that the joints become closer instead of opening by a slight shrink-
ing of the board which must give a decided advantage in floors and
for all purposes where the object is to keep out cold and wet. and by
traversing the cutters across the board I am enabled to dress boards of the
hardest timber as well as of the softer kind. What I claim as new in
this improvement is the whole of the apparatus and combination of
machinery by which the board is traversed by the cutters in dressing the
surface and by which the edges are matched in the dove tail form as
described above and is the invention for which a Patent is now prayed.
In witness that the foregoing is a true description and specification of
my said improvement I have hereunto set my hand this 12 th day of
June 1835.

Witnesses
Henry W. Havens
Elisha F. Abel

Fisher Stedman (Drawing)

2310 [illegible]

Ex.d [illegible]